(12) United States Patent
Hsu

(10) Patent No.: US 12,664,864 B2
(45) Date of Patent: Jun. 23, 2026

(54) LED DOWNLIGHT POWER SUPPLY CIRCUIT AND LED DOWNLIGHT

(71) Applicant: DONGGUAN JIASHENG LIGHTING TECHNOLOGY CO., LTD., Dongguan (CN)

(72) Inventor: Chih-Pin Hsu, Dongguan (CN)

( * ) Notice: Subject to any disclaimer, the term of this patent is extended or adjusted under 35 U.S.C. 154(b) by 56 days.

(21) Appl. No.: 18/900,696

(22) Filed: Sep. 28, 2024

(65) Prior Publication Data

US 2026/0051231 A1      Feb. 19, 2026

(30) Foreign Application Priority Data

Aug. 14, 2024    (CN) .......................... 202421970514.5

(51) Int. Cl.
| | |
|---|---|
| *F21S 9/02* | (2006.01) |
| *F21Y 115/10* | (2016.01) |
| *G08B 7/06* | (2006.01) |
| *G08B 21/18* | (2006.01) |
| *H02J 9/02* | (2006.01) |
| *H05B 45/34* | (2020.01) |
| *H05B 47/17* | (2020.01) |

(52) U.S. Cl.
CPC ................ *G08B 7/06* (2013.01); *F21S 9/022* (2013.01); *G08B 21/185* (2013.01); *H02J 9/02* (2013.01); *H05B 45/34* (2020.01); *H05B 47/172* (2024.01); *F21Y 2115/10* (2016.08)

(58) Field of Classification Search
CPC ......... G08B 7/06; G08B 21/185; F21S 9/022; H02J 9/02; H05B 45/34; H05B 47/172; F21Y 2115/10
See application file for complete search history.

(56) References Cited

U.S. PATENT DOCUMENTS

| | | | | |
|---|---|---|---|---|
| 6,502,044 B1 * | 12/2002 | Lane | ...................... | H02J 9/005 |
| | | | | 363/101 |
| 2015/0214785 A1 * | 7/2015 | Jagjitpati | ............. | H05B 45/385 |
| | | | | 307/66 |
| 2018/0368223 A1 * | 12/2018 | Johnson | ................. | H05B 47/24 |
| 2020/0059997 A1 * | 2/2020 | Dixon | ................... | H02J 7/0068 |
| 2021/0227663 A1 * | 7/2021 | Zhou | ........................ | H02J 9/02 |

* cited by examiner

*Primary Examiner* — Daniel D Chang

(57) ABSTRACT

Disclosed are an LED downlight power supply circuit and an LED downlight, the power supply circuit includes an LED drive control module, a constant voltage output module, a battery boost module, a battery, a microcontroller unit, and an alarm unit. The microcontroller unit is configured to control operating and standby states of an LED drive control circuit and the battery boost module according to an operating state of the constant voltage output module; the microcontroller unit is provided with a timer and is configured to trigger the timer to start timing when the battery is connected to supply power, and to control the alarm unit for alarming when the timer reaches a preset time limit, or to control the LED drive control module to operate intermittently. The battery can be used to power supply to the LED downlight when utility power is unavailable.

9 Claims, 3 Drawing Sheets

LED DOWNLIGHT POWER SUPPLY CIRCUIT AND LED DOWNLIGHT

TECHNICAL FIELD

The present disclosure relates to the technical field of downlights, and particularly relates to an LED downlight power supply circuit and an LED downlight.

BACKGROUND

LED downlights are products improved and developed using new LED lighting sources based on traditional downlights. Compared with the traditional downlights, the LED downlights have the following advantages: energy saving, low carbon, long service life, good color rendering, and fast response speed. The design of the LED downlights is more aesthetic and lightweight. Installation of the LED downlights can maintain the overall unity and perfection of decoration in a building, without disrupting the placement of light fixtures therein, lighting sources are hidden inside the decoration, rather than being exposed or glaring, thereby providing a soft and uniform visual effect.

A battery can be installed inside an emergency downlight, therefore, when the utility power is unavailable to charge the emergency downlight, the emergency downlight can be powered by the battery. However, the service life of the battery is limited, the battery is unable to power supply to the emergency downlight under an emergency situation when the battery is not replaced after expiration of its service lift, posing a safety hazard.

Therefore, the prior art needs to be further improved.

SUMMARY

In view of the deficiencies in the prior art, the present disclosure aims to provide an LED downlight power supply circuit and an LED downlight to solve the problems that the batteries are unable to supply power when they have not been replaced in a timely manner upon the expiration of their service lives in the existing emergency downlights.

Technical solutions of the present disclosure are as follows:

in a first aspect, the present disclosure provides an LED downlight power supply circuit, including an LED drive control module, a constant voltage output module, a battery boost module, a battery, a microcontroller unit, and an alarm unit;

the LED drive control module is configured to be connected to utility power to drive an LED light source;

the constant voltage output module is connected to the battery boost module, the battery, and the microcontroller unit, respectively, and the constant voltage output module is configured to be connected to the utility power, and to output a first voltage to charge the battery after rectifying and stepping down the utility power;

the battery is further connected to the battery boost module and the microcontroller unit, respectively, and the battery is configured to output a second voltage to supply power to the microcontroller unit;

the battery boost module is connected to the battery, and the battery boost module is configured to boost the second voltage to a third voltage to drive the LED light source;

the microcontroller unit is connected to the LED drive control module, the constant voltage output module, the battery boost module, and the battery, respectively, and the microcontroller unit is configured to output a first start signal to the LED drive control module, and to output a second start signal to the battery boost module when it is detected that the constant voltage output module has no voltage output; and the microcontroller unit is provided with a timer, the microcontroller unit is further connected to the alarm unit, the microcontroller unit is configured to trigger the timer to start timing when the battery is connected to supply power, and to output an alarm signal to the alarm unit for alarming when the timer reaches a preset time limit, or to intermittently output the first start signal to the LED drive control module.

In a further arrangement of the present disclosure, the alarm unit is one or more of an LED indicator light and a buzzer.

In a further arrangement of the present disclosure, the LED downlight power supply circuit further includes a test switch SW, one end of the test switch SW is connected to the microcontroller unit, and the other end thereof is grounded.

In a further arrangement of the present disclosure, the LED downlight power supply circuit further includes a charging status indicator light, and the charging status indicator light is connected to the microcontroller unit.

In a further arrangement of the present disclosure, the LED downlight power supply circuit further includes a switch connection interface, one end of the switch connection interface is connected to the battery, and the other end thereof is connected to both the constant voltage output module and the battery boost module.

In a further arrangement of the present disclosure, the LED drive control module includes a relay switch, a first switching tube, and an LED drive unit;

where the relay switch is configured to be connected to a neutral wire of the utility power, and to be connected to both a drain of the first switching tube and the LED drive unit;

the LED driven unit is further configured to be connected to a live wire of the utility power to drive the LED light source; and a gate of the first switching tube is connected to the microcontroller unit, and a source of the first switching tube is grounded.

In a further arrangement of the present disclosure, the constant voltage output module includes a rectifier bridge, a constant voltage control chip, a first capacitor, a second capacitor, a third capacitor, a first diode, a second diode, a transformer, a first resistor, a second resistor, a third resistor, and a fourth resistor;

the rectifier bridge is connected to the utility power;

one end of the first capacitor is connected to a third pin of the rectifier bridge BD, and the other end of the first capacitor is grounded;

one end of the first resistor is connected to an anode of the first diode, and the other end of the first resistor is connected to a first pin of the transformer;

the second capacitor is connected in parallel with the first resistor;

a cathode of the first diode is connected to the constant voltage control chip;

a second pin of the transformer is connected to the constant voltage control chip, a third pin of the transformer is connected to an anode of the second diode, and a fourth pin the transformer is grounded;

a cathode of the second diode is connected to one end of the third capacitor, and the other end of the third capacitor is grounded; and the second resistor is connected in parallel with the third capacitor, and the third resistor is connected is series with the fourth resistor, and then connected in parallel with the second resistor.

In a further arrangement of the present disclosure, the constant voltage output module further includes a fuse, a varistor, a differential mode inductor, and a fourth capacitor;

where the fuse is configured to be connected to the live wire of the utility power;

one end of the varistor is connected to the neutral wire of the utility power, and the other end of the varistor is connected to the fuse; and a first pin of the differential mode inductor is connected to one end of the varistor, a second pin of the differential mode inductor is connected to the other end of the varistor, a third pin of the differential mode inductor is connected to one end of the fourth capacitor and a second pin of the rectifier bridge, and a fourth pin of the differential mode inductor is connected to the other end of the fourth capacitor and a first pin of the rectifier bridge.

In a further arrangement of the present disclosure, the battery boost module includes an energy storage inductor, a boost constant current drive chip, a third diode, and a fourth diode;

where one end of the energy storage inductor is connected to the battery, and the other end of the energy storage inductor is connected to the boost constant current drive chip; and an anode of the third diode is connected to the other end of the energy storage inductor, a cathode of the third diode is connected to an anode of the fourth diode, and an anode of the fourth diode is connected to the LED light source.

In a second aspect, the present disclosure further provides an LED downlight, which includes the LED downlight power supply circuit as described above.

The LED downlight power supply circuit and the LED downlight provided by the present disclosure, where the LED downlight power supply circuit includes the LED drive control module, the constant voltage output module, the battery boost module, the battery, the microcontroller unit, and the alarm unit. The LED drive control module is configured to be connected to utility power to drive an LED light source; the constant voltage output module is configured to be connected to the utility power, and to output a first voltage to charge the battery after rectifying and stepping down the utility power; the battery is configured to output a second voltage to supply power to the microcontroller unit; the battery boost module is configured to boost the second voltage to a third voltage to drive the LED light source; the microcontroller unit is configured to output a first start signal to the LED drive control module, and to output a second start signal to the battery boost module when it is detected that the constant voltage output module has no voltage output; the microcontroller unit is provided with a timer; and the microcontroller unit is further connected to the alarm unit, the microcontroller unit is configured to trigger the timer to start timing when the battery is connected to supply power, and to output an alarm signal to the alarm unit for alarming when the timer reaches a preset time limit, or to intermittently output the first start signal to the LED drive control module. The present disclosure adopts a battery to power the LED downlight when no utility power is available; more-over, when the battery is mounted inside the LED downlight and supplies power to the microcontroller unit, the timer inside the microcontroller unit starts timing, and is capable of outputting the alarm signal to the alarm unit when the timer reaches the preset time limit, or to make the LED drive control module to operate intermittently, and to remind the user to make scheduled replacement of the battery, such that a safety hazard where the battery fails to supply power normally to the emergency downlight can be avoided when the battery is required to supply power in an emergency situation.

BRIEF DESCRIPTION OF THE DRAWINGS

In order to more clearly illustrate the technical solution in embodiments of the present disclosure or in the prior art, a brief introduction to the accompanying drawings required for the description of the embodiments or the prior art will be provided below. Obviously, the accompanying drawings in the following description are merely some embodiments of the present disclosure. Those of ordinary skill in the art would also derive other accompanying drawings from these accompanying drawings without making inventive efforts.

Figure 1:
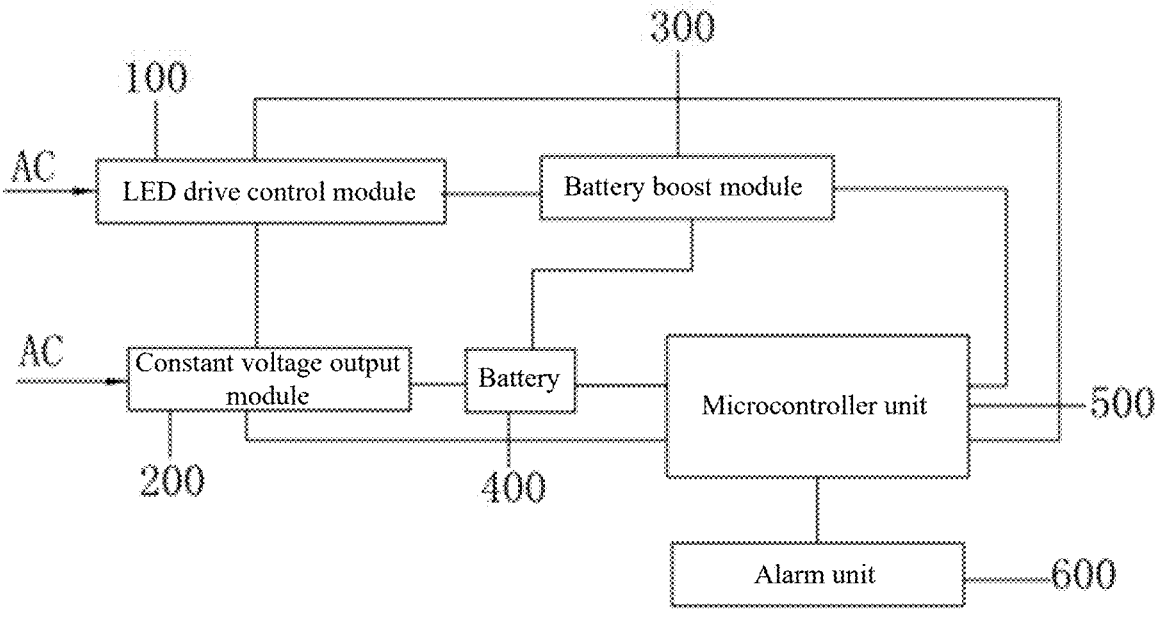
FIG. 1 is a functional block diagram of an LED downlight power supply circuit according to the present disclosure.

Reference numerals in the accompanying drawings: 100. LED drive control module; 110. LED drive unit; 200. constant voltage output module; 300. battery boost module; 400. battery; 500. microcontroller unit; and 600. alarm unit.

DETAILED DESCRIPTIONS OF THE EMBODIMENTS

The present disclosure provides an LED downlight power supply circuit and an LED downlight. In order to make the objectives, technical solutions, and effects of the present disclosure clearer, the present disclosure will be further described in detail below with reference to the accompanying drawings and examples. It should be understood that the specific embodiments described herein are merely used to explain the present disclosure and are not intended to limit the present disclosure.

In the embodiments and the patent scope of the application, unless otherwise specifically defined herein, "a", "an", "said" and "the" may also include plural forms. Under the condition that embodiments of the present disclosure involve descriptions of "first", "second", etc., the descriptions of "first", "second", etc. are for descriptive purposes only and are not to be construed as indicating or implying their relative importance or implicitly specifying the number of indicated technical features. Thus, a feature defined with "first" and "second" may explicitly or implicitly include at least one of the features.

It should be further understood that the word "comprise/include" used in the specification of the present disclosure means presence of stated features, integers, steps, opera-tions, elements and/or components, but does not exclude the presence or addition of one or more other features, integers, steps, operations, elements, components and/or groups thereof. It should be understood that when an element is referred to as being "connected" or "coupled" to another element, it may be directly connected or coupled to another element, or intervening elements may also be present. In addition, "connected" or "coupled" as used herein may include wireless connections or wireless couplings. As used herein, the term "and/or" includes all or any unit and all combinations of one or more of the associated listed items.

It can be understood by those skilled in the art that unless otherwise defined, all terms (including technical terms and scientific terms) used herein have the same meanings as those generally understood by those skilled in the art to which the present disclosure belongs. It should also be understood that terms such as those defined in a general dictionary should be understood to have meanings consistent with those in the context of the prior and will not be interpreted in idealized or overly formal meanings unless specifically defined as herein.

In addition, the technical solutions of the embodiments may be combined with one another, which must be based on the achievement by those of ordinary skill in the art, and when the combinations of the technical solutions contradict one another or cannot be achieved, it should be considered that the combinations of the technical solutions do not exist and do not fall within the scope of protection claimed in the present disclosure.

Figure 2:
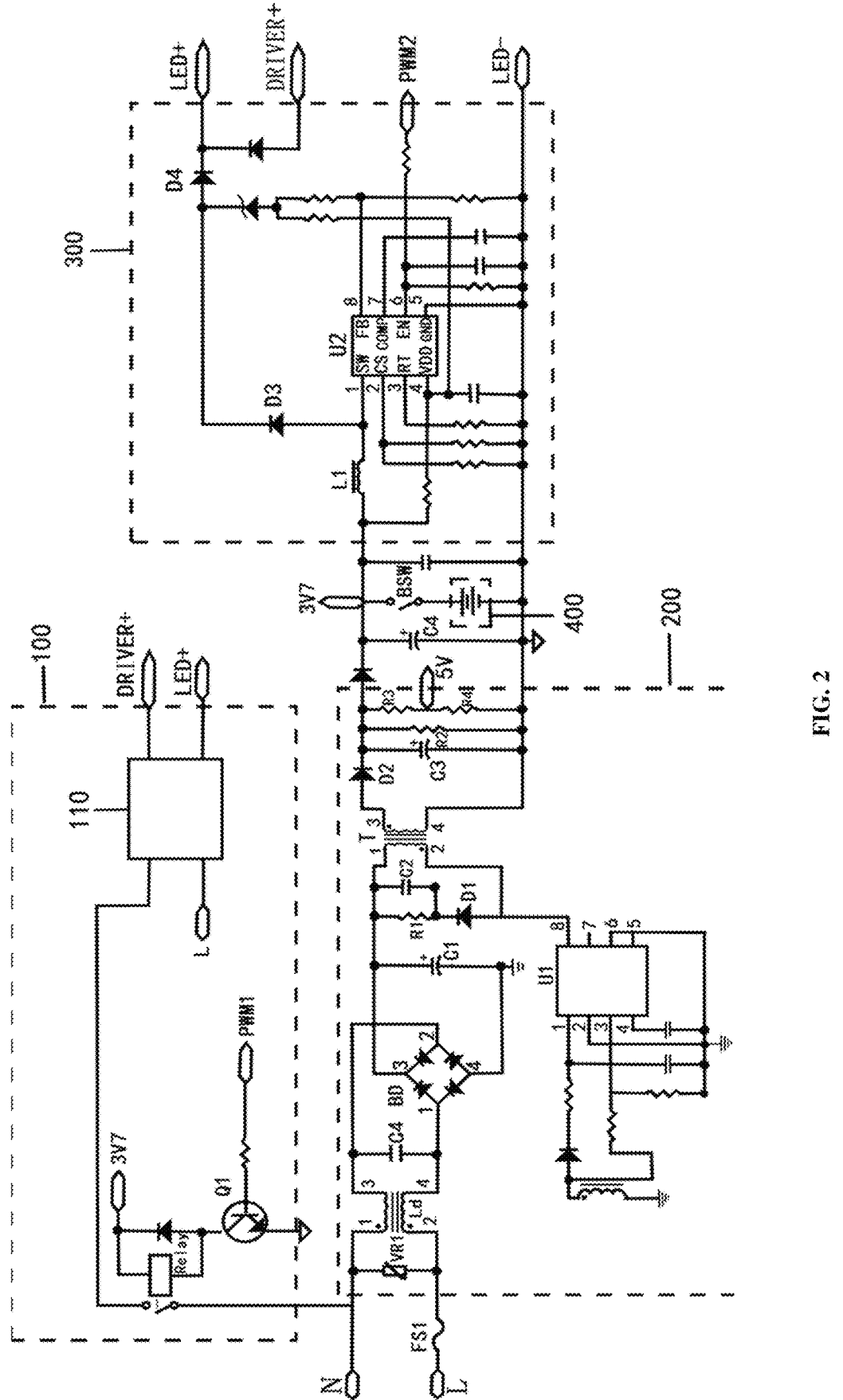
FIG. 2 is a schematic circuit diagram of an LED drive control module, a constant voltage output module, a battery boost module and a battery according to the present disclosure.
Figure 3:
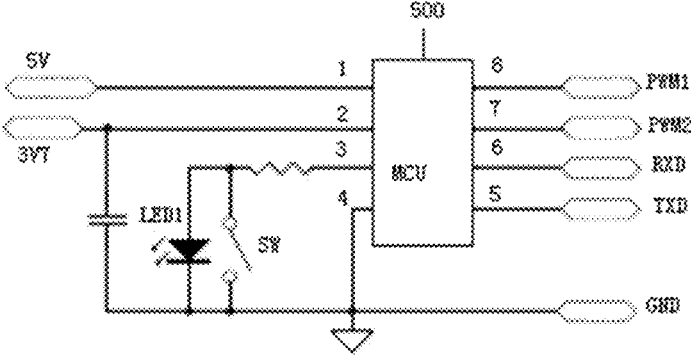
FIG. 3 is a schematic circuit diagram of a microcontroller unit according to the present disclosure.

With reference to FIGS. 1-3, a preferred embodiment of an LED downlight power supply circuit is provided.

In some embodiments, as shown in FIG. 1, the present disclosure provides an LED downlight power supply circuit, which includes an LED drive control module 100, a constant voltage output module 200, a battery boost module 300, a battery 400, a microcontroller unit 500, and an alarm unit 600; where the LED drive control module 100 is configured to be connected to utility power to drive an LED light source; the constant voltage output module 200 is connected to the battery boost module 300, the battery 400, and the microcontroller unit 500, respectively, the constant voltage output module 200 is configured to be connected to the utility power, and to output a first voltage to charge the battery 400 after rectifying and stepping down the utility power; the battery 400 is also connected to the battery boost module 300 and the microcontroller unit 500, respectively, and the battery 400 is configured to output a second voltage to supply power to the microcontroller unit 500; the battery boost module 300 is connected to the battery 400, and the battery boost module 300 is configured to boost the second voltage to a third voltage to drive the LED light source; the microcontroller unit 500 is connected to the LED drive control module 100, the constant voltage output module 200, the battery boost module 300, and the battery 400, respectively, and the microcontroller unit 500 is configured to output a first start signal to the LED drive control module 100, and to output a second start signal to the battery boost module 300 and the battery 400 when it is detected that the constant voltage output module 200 has no voltage output; the microcontroller unit 500 is provided with a timer; and the microcontroller unit 500 is further connected to the alarm unit 600, the microcontroller unit 500 is configured to trigger the timer to start timing when the battery 400 is connected to supply power, and to output an alarm signal to the alarm unit 600 for alarming when the timer reaches a preset time limit, or to intermittently output the first start signal to the LED drive control module 100.

In this embodiment, when the LED downlight is connected to the utility power AC, the microcontroller unit 500 outputs the first start signal to the LED drive control module 100 to drive the LED drive control module 100 to work (the LED drive control module is in a working state when it receives the first start signal, and the LED drive control module is in standby when it does not receive the first start signal), and the utility power drives the LED light source through the LED drive control module 100. The constant voltage output module 200 rectifies and steps down the connected utility power to output the first voltage to charge the battery 400, and the microcontroller unit 500 is capable of detecting a voltage output status of the constant voltage output module 200. When the microcontroller unit 500 detects that the constant voltage output module 200 has a voltage output, it indicates that the utility power is in a normal state, and the microcontroller unit 500 then outputs the first start signal to the LED drive control module 100; when the microcontroller unit 500 is unable to detect a voltage output from the constant voltage output module 200, it indicates an abnormality of the utility power, the LED drive control module 100 suffers a power failure and has no output, in which case, the microcontroller unit 500 will control the LED drive control module 100 to disconnect and output the second start signal at the same time to activate the battery boost module 300 (the battery boost module is in a working state when it receives the second start signal, and the battery boost module is in standby when it does not receive the second start signal), and the battery boost module 300 boosts the second voltage (such as, 3.7V) outputted from the battery 400 to the third voltage to drive the LED light source, thereby achieving an emergency lighting function.

Specifically, when the battery 400 is mounted inside the LED downlight and the microcontroller unit 500 is powered on, the timer inside the microcontroller unit 500 starts timing; when the timer reaches the preset time limit, the microcontroller unit 500 can intermittently output the first start signal to the LED drive control module 100 to make the LED drive control module 100 to operate intermittently, for example, the LED drive control module 100 is controlled to be disconnected once every 10 seconds, such that the LED light source flashes, thereby reminding a user to replace the battery 400. In addition, when a service life of the battery 400 reaches the preset time limit, the alarm unit 600 can be used to remind the user to replace the battery 400. In one implementation mode, the service life of the battery 400 can be set to 2 years, and a specific duration can be adjusted based on actual conditions.

It can be seen that the present disclosure can realize the emergency lighting function by using the battery 400 to power the LED downlight when the utility power is unavailable. Moreover, when the battery 400 is mounted inside the LED downlight and supplies power to the microcontroller unit 500, the timer inside the microcontroller unit 500 starts timing, and is capable of outputting the alarm signal to the alarm unit 600 when the timer reaches the preset time limit, or intermittently outputting the first start signal to the LED drive control module 100 to make the LED drive control module 100 to operate intermittently, and to remind the user to make scheduled replacement of the battery 400, such that a safety hazard where the battery 400 fails to supply power normally to the emergency downlight can be avoided when the battery 400 is required to supply power in an emergency situation, thereby preventing an emergency function from failure due to the service life of the battery 400.

In some embodiments, as shown in FIG. 1, the alarm unit 600 is one or more of an LED indicator light and a buzzer.

In this embodiment, when the service life of the battery 400 reaches its service life, the first start signal can be outputted to the LED drive control module 100 to make the LED drive control module 100 to operate intermittently, such that the LED light source is caused to flash to remind the user to replace the battery 400, and further, the connected alarm unit 600 can also be used for alarming to remind the user to replace the battery 400. The alarm unit 600 can include, but be not limited to, the LED indicator light or the buzzer; when the time reaches the timing time, the microcontroller unit 500 triggers an interruption and can output the alarm signal to drive the LED indicator light or the buzzer to alarm, so as to remind the user that the battery 400 has reached its service life, and a new battery 400 needs to be replaced.

In some embodiments, as shown in FIG. 3, the LED downlight power supply circuit further includes a test switch SW, one end of the test switch SW is connected to the microcontroller unit 500, and the other end of the test switch SW is grounded.

Specifically, the test switch SW is a test button, and the test switch SW is connected to the microcontroller unit 500. When the utility power supply is normal, the emergency function can be tested via the test switch SW to check whether the emergency function of the LED downlight can be used normally. Specifically, when the test switch SW is pressed, the microcontroller unit 500 will first controls the LED drive control module 100 to stop working and output the second start signal to the battery boost module 300, an emergency lighting mode is then activated, in which case, the battery 400 will supply power; and when the LED light source is lighted up, it means that the emergency function is normal; and when the test button is reset, the test mode is exited.

In some embodiments, as shown in FIG. 3, the LED downlight power supply circuit further includes a charging status indicator light LED1, and the charging status indicator light LED1 is connected to the microcontroller unit 500.

In this embodiment, the charging status indicator light LED1 is connected to the microcontroller unit 500 and is capable of displaying a charging status of the battery 400; when the battery 400 is in a charging state, the charging status indicator light LED1 flashes; and once the battery 400 is fully charged, the charging status indicator light LED1 is always on.

In some embodiments, as shown in FIG. 3, the test switch SW and the charging status indicator light LED1 are both connected to a pin 3 of the microcontroller unit 500, and the pin 3 of the microcontroller unit 500 is capable of outputting a high level to the charging status indicator light LED1, and is capable of detecting an on-off state of the test switch SW.

In some embodiments, as shown in FIG. 2, the LED downlight power supply circuit further includes a switch connection interface BSW, one end of the switch connection interface BSW is connected to the battery 400, and the other end of the switch connection interface BSW is connected to both the constant voltage output module 200 and the battery boost module 300.

In this embodiment, the battery 400 is connected to the microcontroller unit 500 and the battery boost module 300 via the switch connection interface BSW, such that the battery 400 can be disconnected before the LED downlight is installed to protect the battery 400, which can reduce drain of the battery 400 of a lighting fixture during storage and transportation, facilitate the replacement of the battery 400, and maintenance cost is reduced compared with the conventional products on the market that require an overall replacement of the emergency power supply. Furthermore, when the battery 400 is disconnected from the switch connection interface BSW, the LED downlight can be used as a common light fixture; and when the switch connection interface is closed, the LED downlight can be used as an emergency lighting fixture.

In some embodiments, as shown in FIGS. 2 and 3, the LED drive control module 100 includes a relay switch (Relay), a first switching tube Q1, and an LED drive unit 110, where the relay switch (Relay) is configured to be connected to a neutral wire (N) of the utility power, and to be connected to both a drain of the first switching tube Q1 and the LED drive unit 110; the LED driven unit 110 is further connected to a live wire (L) of the utility power to drive the LED light source; and a gate of the first switching tube Q1 is connected to the microcontroller unit 500, and a source of the first switching tube Q1 is grounded.

In this embodiment, the relay switch (Relay) is capable of controlling the connection and disconnection of the utility power to achieve on or off of the LED downlight, and the relay switch (Relay) can be independently controlled without affecting other features of the light fixture such as TRIAC dimming, 0-10V dimming, remote control, wall switch, and the like, and can be adapted to different types of the LED drive according to actual needs, exhibiting strong compatibility. A pin 8 of the microcontroller unit 500 is connected to the gate of the first switching tube Q1 and is capable of outputting a first pulse-width modulation signal (PWM1, that is, the first start signal) to control on and off of the first switching tube Q1, such that engagement and disengagement of the relay switch (Relay) can be further controlled, and switching control of the working and standby states of the LED drive control module 100 can be finally realized. It should be noted that the LED drive unit 110 has a conventional circuit structure, so it is not described in detail herein.

In some embodiments, as shown in FIG. 2, the constant voltage output module 200 includes a rectifier bridge BD, a constant voltage control chip U1, a first capacitor C1, a second capacitor C2, a third capacitor C3, a first diode D1, a second diode D2, a transformer T, a first resistor R1, a second resistor R2, a third resistor R3, and a fourth resistor R4; where the rectifier bridge BD is connected to the utility power; one end of the first capacitor C1 is connected to a third pin (that is, a pin 3) of the rectifier bridge BD, and the other end of the first capacitor C1 is grounded; one end of the first resistor R1 is connected to an anode of the first diode D1, the other end of the first resistor R1 is connected to a first pin (that is, a pin 1) of the transformer T; the second capacitor C2 is connected in parallel with the first resistor R1; a cathode of the first diode D1 is connected to the constant voltage control chip U1; a second pin (that is, a pin 2) of the transformer T is connected to the constant voltage control chip U1, a third pin of the transformer T is connected to an anode of the second diode D2, and a fourth pin (that is, a pin 4) the transformer T is grounded; a cathode of the second diode D2 is connected to one end of the third capacitor C3, and the other end of the third capacitor C3 is grounded; and the second resistor R2 is connected in parallel with the third capacitor C3, and the third resistor R3 and the fourth resistor R4 are connected in series, and then connected in parallel with the second resistor R2.

In this embodiment, the rectifier bridge BD performs full-wave rectification, and the rectifier bridge BD is capable of rectifying the connected AC utility power. The constant voltage control chip U1 is a PWM constant voltage control chip, which is an AC/DC power supply chip with a built-in MOS tube, an internal digital logic control module thereof is capable of controlling on and off of a primary winding of the transformer T on feedback signals of an outputted voltage; the primary winding stores energy when it is on; and the second diode D2 is on when the primary winding is off, the primary winding of the transformer T is capable of being coupled and transmitted to an output terminal of the constant voltage output module 200, and constant voltage control chip U1 is capable of controlling a DC output voltage level of the output terminal of the constant voltage output module 200. In one implementation mode, the constant voltage control chip U1 is capable of controlling an output terminal of the constant voltage output module 200 to output a 5V DC voltage.

Specifically, the output terminal of the constant voltage output module 200 is connected to a pin 2 of the microcontroller unit 500, the microcontroller unit 500 is capable of detecting whether the output terminal of the constant voltage output module 200 outputs any voltage, and it is possible to check whether the utility power is functioning normally by detecting the voltage from the output terminal of the constant voltage output module 200, thereby determining whether it is necessary to activate the emergency lighting function.

Further, as shown in FIG. 2, the constant voltage output module 200 also includes a fuse FS1, a varistor VR1, a differential mode inductor Ld, and a fourth capacitor C4, where the fuse FS1 is configured to be connected to the live wire (L) of the utility power; one end of the varistor VR1 is connected to the neutral wire (N) of the utility power, and the other end of the varistor VR1 is connected to the fuse FS1; a first pin (that is, a pin 1) of the differential mode inductor Ld is connected to one end of the varistor VR1, a second pin (that is, a pin 2) of the differential mode inductor Ld is connected to the other end of the varistor VR1, a third pin (that is, a pin 3) of the differential mode inductor Ld is connected to one end of the fourth capacitor C4 and a second pin of the rectifier bridge BD, and a fourth pin (that is, a pin 4) of the differential mode inductor Ld is connected to the other end of the fourth capacitor C4 and a first pin of the rectifier bridge BD.

In this embodiment, the fuse FS1 can be disconnected when an inputted AC current is too high, thereby protecting the LED downlight. The varistor VR1 is capable of preventing surges to protect the subsequent circuits from being damaged by voltage spikes. The differential mode inductor Ld is capable of suppressing differential mode interference between the live wire and the neutral wire.

In some embodiments, as shown in FIG. 2, the battery boost module 300 includes an energy storage inductor L1, a boost constant current drive chip U2, a third diode D3, and a fourth diode D4, where one end of the energy storage inductor L1 is connected to the battery 400, and the other end of the energy storage inductor L1 is connected to the boost constant current drive chip U2; an anode of the third diode D3 is connected to the other end of the energy storage inductor L1, a cathode of the third diode D3 is connected to an anode of the fourth diode D4, and a cathode of the fourth diode D4 is connected to the LED light source.

In this embodiment, the boost constant current drive chip U2 is internally integrated with a voltage reference, an operational amplifier, and a current comparator can be obtained by setting external components, such that brightness of the LED downlight can be set. The energy storage inductor L1 is connected to a switch pin (that is, a pin 1) of the boost constant current drive chip U2, the boost constant current drive chip U2 is capable of controlling the time of on or off of the energy storage inductor L1 through an internal MOS tube, such that an outputted voltage from the battery 400 can be boosted to a third voltage to drive the LED light source. The third diode D3 is a flyback diode, and the fourth diode D4 is capable of preventing the LED drive current from flowing back. Specifically, an enable pin (that is, a pin

6) of the boost constant current drive chip U2 is connected to a pin 7 of the microcontroller unit 500, the microcontroller unit 500 is capable of outputting a second pulse-width modulation signal PWM2 (that is, the second start signal) to control an operating state of the boost constant current drive chip U2, that is, in an operating state or a standby state.

In some embodiments, the present disclosure further provides an LED downlight, which includes the LED downlight power supply circuit as described above, specifically described in detail in the LED downlight power supply circuit, which will not be repeated herein.

Overall, the LED downlight power supply circuit and the LED downlight provided by the present disclosure have the following beneficial effects:

the present disclosure can realize the emergency lighting function by using the battery to power the LED downlight when the utility power is unavailable.

When the battery is mounted inside the LED downlight and supplies power to the microcontroller unit, the timer inside the microcontroller unit starts timing, and is capable of outputting the alarm signal to the alarm unit when the timer reaches the preset time limit, or to make the LED drive control module to operate intermittently, and to remind the user to make scheduled replacement of the battery, such that a safety hazard where the battery fails to supply power normally to the emergency downlight can be avoided when the battery is required to supply power in an emergency situation.

The battery is connected to the microcontroller unit and the battery boost module through a switch connection interface, such that the battery can be disconnected before the LED downlight is installed to protect the battery, which can reduce drain of the battery of a lighting fixture during storage and transportation, facilitate the replacement of the battery, and maintenance cost is reduced compared with the conventional products on the market that require an overall replacement of the emergency power supply; when the battery is disconnected from the switch connection interface, the LED downlight can be used as a common light fixture; and when the switch connection interface is closed, the LED downlight can be used as an emergency lighting fixture.

It should be understood that the application of the present disclosure is not limited to the above examples. For those of ordinary skill in the art, improvements or variations can be made based on the foregoing description, and all these improvements or variations shall fall within the scope of protection of the appended claims of the present disclosure.

What is claimed is:

1. An LED downlight power supply circuit, comprising an LED drive control module, a constant voltage output module, a battery boost module, a battery, a microcontroller unit, and an alarm unit; wherein the LED drive control module is configured to be connected to utility power to drive an LED light source;

the constant voltage output module is connected to the battery boost module, the battery, and the microcontroller unit, respectively, and the constant voltage output module is configured to be connected to the utility power, and to output a first voltage to charge the battery after rectifying and stepping down the utility power;

the battery is further connected to the battery boost module and the microcontroller unit, respectively, and the battery is configured to output a second voltage to supply power to the microcontroller unit;

the battery boost module is connected to the battery, and the battery boost module is configured to boost the second voltage to a third voltage to drive the LED light source;

the microcontroller unit is connected to the LED drive control module, the constant voltage output module, the battery boost module, and the battery, respectively, and the microcontroller unit is configured to output a first start signal to the LED drive control module, and to output a second start signal to the battery boost module when it is detected that the constant voltage output module has no voltage output; and the microcontroller unit is provided with a timer; the microcontroller unit is further connected to the alarm unit, the microcontroller unit is configured to trigger the timer to start timing when the battery is connected to supply power, and to output an alarm signal to the alarm unit for alarming when the timer reaches a preset time limit, or to intermittently output the first start signal to the LED drive control module;

wherein the LED downlight power supply circuit further comprises a switch connection interface, one end of the switch connection interface is connected to the battery, and the other end thereof is connected to both the constant voltage output module and the battery boost module.

2. The LED downlight power supply circuit according to claim 1, wherein the alarm unit is one or more of an LED indicator light and a buzzer.

3. The LED downlight power supply circuit according to claim 1, further comprising a test switch, one end of the test switch is connected to the microcontroller unit, and the other end thereof is grounded.

4. The LED downlight power supply circuit according to claim 1, further comprising a charging status indicator light, and the charging status indicator light is connected to the microcontroller unit.

5. The LED downlight power supply circuit according to claim 1, wherein the LED drive control module comprises a relay switch, a first switching tube, and an LED drive unit; wherein the relay switch is configured to be connected to a neutral wire of the utility power, and to be connected to both a drain of the first switching tube and the LED drive unit;

the LED driven unit is further configured to be connected to a live wire of the utility power to drive the LED light source; and a gate of the first switching tube is connected to the microcontroller unit, and a source of the first switching tube is grounded.

6. The LED downlight power supply circuit according to claim 1, wherein the constant voltage output module comprises a rectifier bridge, a constant voltage control chip, a first capacitor, a second capacitor, a third capacitor, a first diode, a second diode, a transformer, a first resistor, a second resistor, a third resistor, and a fourth resistor; wherein the rectifier bridge is connected to the utility power;

one end of the first capacitor is connected to a third pin of the rectifier bridge BD, and the other end of the first capacitor is grounded;

one end of the first resistor is connected to a cathode of the first diode, and the other end of the first resistor is connected to a first pin of the transformer;

the second capacitor is connected in parallel with the first resistor;

an anode of the first diode is connected to the constant voltage control chip;

a second pin of the transformer is connected to the constant voltage control chip, a third pin of the transformer is connected to an anode of the second diode, and a fourth pin the transformer is grounded;

a cathode of the second diode is connected to one end of the third capacitor, and the other end of the third capacitor is grounded; and the second resistor is connected in parallel with the third capacitor, and the third resistor is connected is series with the fourth resistor, and then connected in parallel with the second resistor.

7. The LED downlight power supply circuit according to claim 6, wherein the constant voltage output module further comprises a fuse, a varistor, a differential mode inductor, and a fourth capacitor, wherein the fuse is configured to be connected to the live wire of the utility power;

one end of the varistor is connected to the neutral wire of the utility power, and the other end of the varistor is connected to the fuse; and a first pin of the differential mode inductor is connected to one end of the varistor, a second pin of the differential mode inductor is connected to the other end of the varistor, a third pin of the differential mode inductor is connected to one end of the fourth capacitor and a second pin of the rectifier bridge, and a fourth pin of the differential mode inductor is connected to the other end of the fourth capacitor and a first pin of the rectifier bridge.

8. The LED downlight power supply circuit according to claim 1, wherein the battery boost module comprises an energy storage inductor, a boost constant current drive chip, a third diode, and a fourth diode; wherein one end of the energy storage inductor is connected to the battery, and the other end of the energy storage inductor is connected to the boost constant current drive chip; and an anode of the third diode is connected to the other end of the energy storage inductor, a cathode of the third diode is connected to an anode of the fourth diode, and an anode of the fourth diode is connected to the LED light source.

9. An LED downlight, comprising the LED downlight power supply circuit according to claim 1.

* * * * *